R. H. YALE.
TRACTION-WHEEL.
No. 193,680. Patented July 31, 1877.
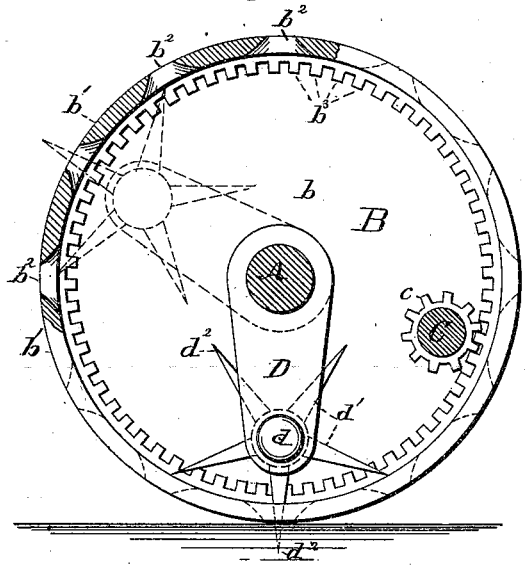
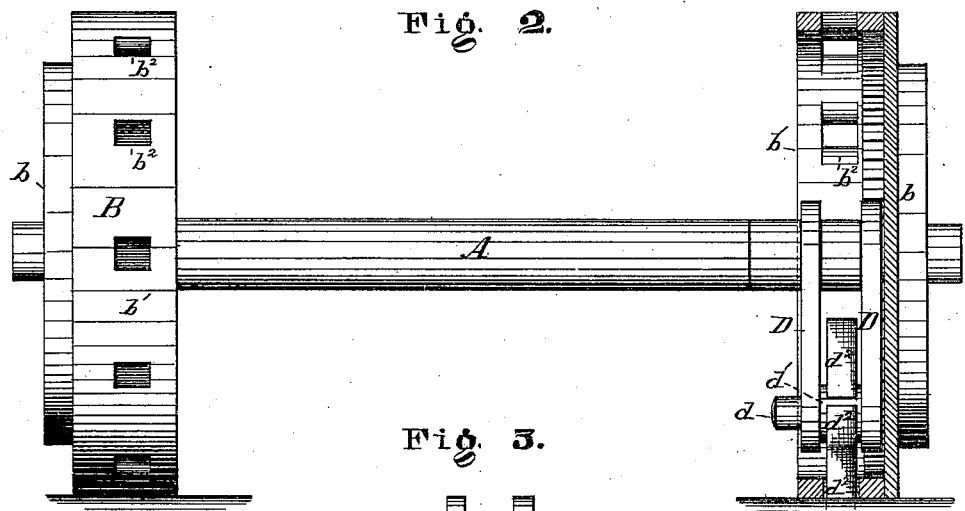
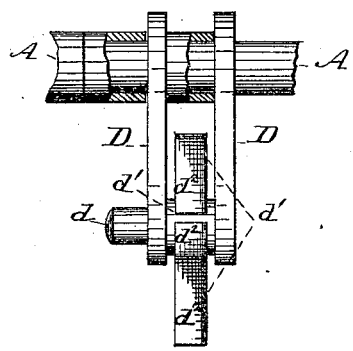
WITNESSES:
Mamie W. Stallings
Robt. R. Cooke.
INVENTOR:
R. H YALE,
BY
H. W. Beadle & Co.
ATTYS.

UNITED STATES PATENT OFFICE.

RICHARD H. YALE, OF NEW ORLEANS, LOUISIANA.

IMPROVEMENT IN TRACTION-WHEELS.

Specification forming part of Letters Patent No. 193,680, dated July 31, 1877; application filed July 10, 1877.

*To all whom it may concern:*

Be it known that I, RICHARD H. YALE, of New Orleans, in the county of Orleans, State of Louisiana, have invented a new and useful Improvement in Traction-Wheels; and I do hereby declare that the following is a full and exact description of the same, reference being had to the accompanying drawing, and to the letters of reference marked thereon.

My invention consists, mainly, in the combination of the main driving-wheel of a traction-engine, with an independent spur or traction wheel, capable of adjustment in such manner as to be readily employed in connection with the bearing-face of the main wheel, when it is desired to prevent the same from slipping, and also to be readily removed from the bearing-face when its action is not desired.

In the drawings, Figure 1 represents a side elevation of my improved traction-wheel taken from the inner side; Fig. 2, a pair of wheels connected by an axle, one of the wheels being sectioned perpendicularly; and Fig. 3, a detail view of the spur-wheel and attachments.

To enable others skilled in the art to make and use my invention, I will now proceed to describe fully its construction and manner of operation.

A represents the axle of the main driving-wheel, which is properly secured by bearings in the frame-work of the engine, which may be of any suitable construction. B represents a main driving-wheel, suitably secured to the axle A in the usual or other proper manner, which consists of the circular plate or disk $b$, and the right-angled flange or ring $b^1$, having the series of openings $b^2$ $b^2$, as shown. $b^3$ represents an internal annular rack or gear, strongly secured in the angle between the disk and flange, as shown. C represents a shaft supported in any proper bearings in the frame-work, which, at one end, is adapted to receive rotary motion in any proper manner, and at the other is provided with a pinion, $c$, adapted to engage with the annular gear $b^3$, as shown. D D represent arms or links loosely hung at their upper ends to the axle A, which are provided at their lower ends with proper bearings for supporting the shaft $d$ of the wheel $d^1$, as shown.

This wheel $d^1$, it will be observed, is located between the links or arms D D, within the vertical plane of the ring or flange, in such position that the spurs or blades $d^2$, with which it is provided, are caused to project through the openings in the main wheel, as shown.

A fixed relation exists, of course, between the space separating the openings in the main wheel and the space between the spurs or blades of the traction-wheel, so that a proper engagement of the parts is produced by the revolution of the main wheel without undue friction or improper contact.

The spur-wheel must be, of course, sufficiently small in diameter to be suspended between the axis of the main driving-wheel and its inner periphery, the relative size between the two, which is preferred, being that of one to twelve, so that a wheel five feet in diameter will have five inches traction, one of six feet, six inches, &c.

The width of the main driving-wheel should correspond with the weight of the engine to be carried, and the character of the soil upon which it is be used.

The traction-spurs may be of any proper width and length, according to the circumstances of the case.

It will be understood that the spur or traction wheel is secured to the axle by arms, which are radii of a circle concentric with the circumference of the wheel.

From this construction it follows that the position of the spur-wheel relatively to a vertical line may be changed, at will, by swinging its arms on the axle without affecting its relation to the circumference of the wheel in the slightest degree.

The operation of my improved wheel is as follows: Motion is communicated to the shaft C in any proper manner from the main source. By the revolution of this shaft movement is communicated through the pinion $c$ and gear $b^3$ to the main driving-wheel B, for the purpose of conveying the engine over the ground.

When it is desired to use the spur-wheel for the purpose of increasing the traction the links or arms of the same are held in a direct vertical line, as shown in full lines, Fig. 1, by which means the spurs or blades are caused to project through the openings of the wheel at the point of contact of the latter with the ground.

These arms being rigidly held in this position it follows that as the main wheel travels over the ground the spur-wheel is caused to revolve, and to thrust its blades successively into the earth at the point of contact, and thus hold the wheel against slipping.

When it is desired to use the main wheel without the traction-wheel the latter may be readily removed from its central position by properly swinging its links or arms away from the vertical line, as shown in dotted lines, Fig. 1, in which position it will continue to revolve, but without contact, of course, with the earth. Two of these wheels may be attached to an engine, if desired, or a single central wheel with side-bearing wheels may be employed.

Some of the advantages of this construction are as follows: The traction-wheel may be used or not as the circumstances of the case require, it being readily moved out of the way, so as to be inoperative at the will of the engineer.

By the employment of the internal peripheral gearing the power of the engine is applied to the wheel in the most advantageous manner to obtain great power rather than high speed. By locating the gear within the wheel it is in a measure covered and protected.

The construction described is simple, yet durable, and very effective in its action.

Having thus fully described my invention, what I claim as new, and desire to secure by Letters Patent, is—

1. The combination of the main driving-wheel of a traction-engine with an independent spur-wheel, substantially as described.

2. The combination of the wheel B, having openings, as described, with the spur-wheel, having blades adapted to project through said openings, as described.

3. In combination with the main wheel and axle, the links or arms supporting the spur-wheel, adapted to revolve, as and for the purpose set forth.

R. H. YALE.

Witnesses:
C. H. STOCKER,
F. J. BARTHELEMY.